US007130803B1

(12) United States Patent
Couch et al.

(10) Patent No.: US 7,130,803 B1
(45) Date of Patent: Oct. 31, 2006

(54) UNIQUE VIRTUAL DYNAMICALLY-CAPABLE ADDRESSING SYSTEM AND METHOD OF MAIL AND PARCEL DELIVERY AND FORWARDING

(76) Inventors: John P. Couch, 737 Holly Dr., Annapolis, MD (US) 21401; Stephen E. Johnson, 5 Burnside St., Apt. #3, Salem, MA (US) 10970

( * ) Notice: Subject to any disclaimer, the term of this patent is extended or adjusted under 35 U.S.C. 154(b) by 782 days.

(21) Appl. No.: 09/974,863

(22) Filed: Oct. 12, 2001

Related U.S. Application Data

(60) Provisional application No. 60/239,894, filed on Oct. 13, 2000.

(51) Int. Cl.
*G06F 17/20* (2006.01)

(52) U.S. Cl. .......................................................... 705/1

(58) Field of Classification Search .................... 705/1, 705/401, 408, 410
See application file for complete search history.

(56) References Cited

U.S. PATENT DOCUMENTS 5,422,821 A * 6/1995 Allen et al. ................. 700/219
5,936,865 A * 8/1999 Pintsov et al. .............. 700/107
6,073,076 A * 6/2000 Crowley et al. ............ 701/208
6,105,014 A * 8/2000 Ramsden et al. ........... 705/410
6,330,550 B1 * 12/2001 Brisebois et al. ............. 705/75
6,549,892 B1 * 4/2003 Sansone ..................... 705/401
6,674,038 B1 * 1/2004 Latta .......................... 209/584

FOREIGN PATENT DOCUMENTS

EP 0710930 A2 * 5/1996

OTHER PUBLICATIONS

Mummert: "Boost your mail's delivery", Target Marketing, Nov. 1994, vol. 17, No. 11, pp. 32-36.*
www.mydcmail.com.*
www.myUS.com.*

* cited by examiner

*Primary Examiner*—John G. Weiss
*Assistant Examiner*—Cang (James) G. Thai
(74) *Attorney, Agent, or Firm*—Oliff & Berridge, PLC

(57) ABSTRACT

A system and method for unique virtual dynamically-capable (UVDC) addressing relating to mail and parcel delivery and forwarding. The UVDC addressing system comprises at least one data collection processing and storage Host that creates a unique virtual dynamically-capable (UVDC) address for a subscriber be it an individual, business or other entity, that contains a UVDC address code, and an associated informational data set and a mechanism for conveying this data when the Host is queried by a mail/parcel processing facility. The informational data set corresponding to the UVDC address code is changeable to adapt to the changing needs and desires of the subscriber. By virtue of their UDVC address, the subscriber can have a mail/parcel delivered to any facility by any means and have them sent to any final delivery point by any means with the final delivery point being changeable at any time while mail/parcel remains within the UVDCA system. The UVDC addressing system provides the only addressing system that allows a seamless interface between all elements of current, conventional mail and parcel delivery infrastructure, such as between the U.S. Postal System and other non-postal parcel carriers, like United Parcel Services and Federal Express. Now free from problems of the conventional legacy address model of one address per person per physical location or per delivery point of mail and parcels, people and other entities can get mail and parcels delivered wherever they want, whenever they want, no matter the delivery method, no matter what. All they need is a UVDC Address and the UVDC addressing system will take care of the rest.

18 Claims, 2 Drawing Sheets

UNIQUE VIRTUAL DYNAMICALLY-CAPABLE ADDRESSING SYSTEM AND METHOD OF MAIL AND PARCEL DELIVERY AND FORWARDING

This nonprovisional application claims the benefit of U.S. Provisional Application No. 60/239,894 filed Oct. 13, 2000.

BACKGROUND OF THE INVENTION

1. Field of Invention

The invention relates to a system and method that allows for the implementation of at least one unique virtual dynamically-capable (UVDC) address relating to mail and parcel delivery and forwarding.

2. Description of Related Art

Over the course of history an accepted practice was developed and adopted to match mail and parcels sent to an intended recipient. This practice was derived from the notion that a person only resided at one place or worked at one place and naturally could be found there to take delivery of any mail and parcel addressed for that person. Thus, the legacy model and practice of one address per person per physical location or per delivery point of mail and parcels was born. Socio-governmental convention has promulgated this model over the years and refined it into the form of the current postal mail delivery.

Early addresses included such labeling as: Deliver to Jane Doe, who lives in the house with the green roof, next to the yellow windmill by the River Themes where Mill Creek enters the river. As time went on conventional addresses were refined as house and building numbering systems and street names took shape. As such, a person's address was in the town where they lived, at the house in which they resided, at the building where they worked, or at an accepted location/facility that acted as a general mail and parcel terminal holding area. As mail addressing and delivery mechanisms continued to be developed, both public and private mail and parcel delivery entities sprung up. Because the greater society needed to be served, governmental involvement took place, typically in the form of a Postal Service. With Postal Service involvement, addressing and mail and parcel delivery became more structured and formalized, with any private mail and parcel delivery entity following the rules and structures set forth by the Postal Service. This legacy model remains in effect to this day.

In essence, a legacy model address is a fixed physical location that corresponds to a house/building on a specific street, correlated to the name of the intended recipient of said mail and parcels. This model assumes that there is no "connectivity" between addresses, that each address is independent and has no relationship to any other address whatsoever. It further assumes that the delivery point, the physical location, the address, is fixed, even though the occupants of the address may change over time. So, when addresses, addressing and mail and parcel delivery concepts were being accepted into society the mobility of people, let alone addresses, was not a big concern.

Over time, people have become much more mobile, in a broader geographical sense, and the need for being able to take delivery of mail and parcels wherever a person was at the moment or wanted their mail and parcels to be, has grown significantly, especially in recent years. Transportation of people, as well as mail and parcels, quickly and efficiently, coupled with better and faster communication methods has caused this accepted legacy model to become increasingly obsolete. With people on the move, be it temporarily (business trips, vacation, work lifestyle) or permanently (residence relocation), they are failing to get desired mail and parcels where they want them, when they want them. As a result, the legacy addressing model cannot keep pace with the advances of society.

Attempts to meet this growing need, being based on this legacy model, have failed to fully embrace it, due to the inherent limitations of the legacy addressing model itself. These attempts have come in the form of mail/parcel receiving and forwarding operations (RFOs), ranging from single, stand-alone entities to corporate nationwide franchises, like Mail Boxes, Etc. or Parcel Plus, to simply having a P.O. Box at a local Post Office. (Note: In U.S. Postal Service terms, these RFOs may operate as a Commercial Mail Receiving Authority, as defined in its Domestic Mail Manual.) As will be shown below, any mechanism based on the legacy model cannot meet this new need; hence a new model is desirable.

To explain the shortcomings of these attempts to meet the increasing need for mail and parcels to be delivered wherever and whenever a person wants, a look at how a mail/parcel RFO works is presented. Simply put, a mail/parcel RFO provides a substitute address for a person, different from where that person lives or works, but still a fixed physical mail and parcel delivery point; the concept being that the RFO receives mail and parcels on behalf of a person and holds it/them until that person takes delivery. This is useful to people who will return to this same RFO to collect any mail and parcels being held for them, but barely useful to a person who will rarely, perhaps ever again, return to that RFO.

As a person needed to take delivery of mail and parcels in more geographic locations, an address was needed for each RFO located where the person needed their mail and parcels delivered. Each of these addresses was independent of the other, even if the facilities were of the same operating franchise. While this concept seems to solve the "where" issue, it certainly does not solve the "when" issue. Because of the when not being met, a person could have mail and parcels sent to one of their RFOs only to find that they would never be getting to that RFO to take delivery of any mail and parcels awaiting pick up there. This, of course, is quite problematic.

Additionally, wanting to get mail and parcels delivered to more than one physical delivery point and any geographic location using the mail and parcel RFO concept, means having an address for every RFO in every geographic location. While in theory the legacy model is scalable this way, in practice it is not. Practically speaking, having tens or hundreds of independent RFO addresses becomes quite difficult to manage.

Recognizing this shortcoming, these RFOs have also included mail/parcel forwarding. In this case, the address holder at a given RFO advises its operator where to send any mail/parcels the RFO receives for the RFO address holder. While on the surface, this attempt seems to ameliorate the deficiencies of having hundreds of RFO addresses to worry about, in actuality, it compounds them. This is because now at least two independent addresses are needed per mail/parcel forwarded to the final destination, whereas without the forwarding only one was needed. These addresses are for the RFO itself and the address of the delivery point desired in the geographic location specified. So again, to have mail and parcels arrive in different geographic locations, a corresponding number of independent addresses are needed, plus one; that of the RFO that does the forwarding.

Here is an example of how poorly such attempts fare when it comes to meeting a person's need of getting mail and parcels where they are wanted and when they are wanted. Jane Smith lives at 123 Main St., Alexandria, Va. 22307. She travels a lot due to work requirements. Recognizing this, she uses an RFO in each city she visits plus one in Alexandria, so she can get mail and parcels where she wants. Jane visits 22 cities a year. So she needs 23 addresses to get mail and parcels where she wants, 24 if her home address is counted. Since she does not know when she will be in each city, she finds it hard to know where to send mail to where she will be. She learns this lesson after having mail/parcels stranded for months at several RFOs until she can get back to each one as her job allows.

She then discovers that each of these RFOs not only receives mail for her, they can forward it too. Thinking she has made a breakthrough, for her next business trip, she tells RFOs 1–18, and 20–23 to forward her mail and parcels to RFO 19. To do this she has to contact all 23 operators of her respective RFOs. For all but RFO 19 she tells them to forward her mail and parcels to RFO 19. For RFO 19 she tells them to hold her mail and parcels for pick-up. No sooner does she get to the city where RFO 19 is, when she finds she now has to go to another city, to where RFO 12 is located. So she contacts each RFO with another set of instructions. And so it goes, until one day her boss tells her that her territory has been expanded to 122 cities! Jane gives up.

SUMMARY OF THE INVENTION

There is a need for a new addressing model relating to mail and parcel delivery and forwarding that overcomes the deficiencies of the historic and currently accepted legacy model and practice of one address per person per physical location or per delivery point of mail and parcels.

The invention overcomes the problems and deficiencies of the currently accepted legacy model and practice of one address per person per physical location or per delivery point of mail and parcels by providing a system and method that allows for the implementation of at least one unique virtual dynamically-capable (UVDC) address code relating to mail and parcel delivery and forwarding for a Subscriber. Associated with these UVDC address codes is an informational data set, comprised of at least one piece of information, that pertains to mail/parcel disposition, including such information as delivery and forwarding instructions. During the implementation of UVDC addressing, any recipient of the mail/parcel or Facility, with access to the subject system, can ascertain and transact the disposition of the mail and parcel, on behalf of the Subscriber, the entity that holds ("owns") the subject UVDC address code, based on a last known informational data set pertaining to the delivery and forwarding of mail/parcels associated with the respective UVDC address.

To finally solve this need for being able to take delivery of mail and parcels wherever a person was at the moment or wanted their mail and parcels to be, a new addressing model is provided. This model is based upon a unique virtual dynamically-capable (UVDC) addressing system and method. The basis of which lies in creating an addressing scheme that is both unique and at the same time not dependent on any particular physical mail/parcel delivery point. Furthermore, this model is predicated upon address management, at the system level, which oversees the implementation of all UVDC address codes. It should be noted that the legacy model is in fact a subset of this new model (UVDC addressing in a non-dynamic implementation) and as such, the UVDC addressing model does not invalidate the legacy model but works "on top of" or is "transparent" to it. This is essential since the current nationwide mail and parcel delivery infrastructure is based on the legacy model. The new model exploits this infrastructure during its implementation; the end goal being—getting mail and parcels intended for a recipient, when and to where the Subscriber wants them to be.

Participants in the UVDC addressing model are:

1) Subscribers—Those that use the UVDC addressing system to get mail and parcels delivered to their desired final delivery point. They provide the informational data set to the Host. Subscribers can be "inserters" of mail and parcels into the UVDC addressing system as well as recipients of mail/parcels that have been transacted through the UVDC addressing system. Subscribers can also be a legal "entity" that owns the UVDC address code for a business or other group of persons, such as a corporation. As such, a Subscriber need not be an individual.

2) Facilities—The physical locations and operations where UVDC addressed mail and parcels are processed and handled. Legacy addressed mail and parcels may also be processed and handled at a facility. Mail and parcel tracking and identification are initiated and conducted here. Any Facility can be an intermediate or final delivery point.

3) Host—The entity that implements the UVDC addressing system and method.

4) Non-Subscribers—Those that can "insert" UVDC addressed mail and parcels into UVDC addressing system as well as be recipients of legacy addressed mail and parcels that have been transacted on behalf of Subscriber.

5) Non-Facilities—Legacy address model capable ONLY mail and parcel handling and processing locations and operations. All mail and parcels processed here are treated as legacy addressed mail and parcels.

6) Delivery/Delivered/Deliverers—The transport mechanism for mail and parcel delivery.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

To effect this new model, as stated earlier, the existing mail and parcel address and delivery infrastructure, typified by the U.S. Postal Service, will be exploited. It will be the existing mechanical foundation on which the UVDCA model will be placed.

Figure 1:
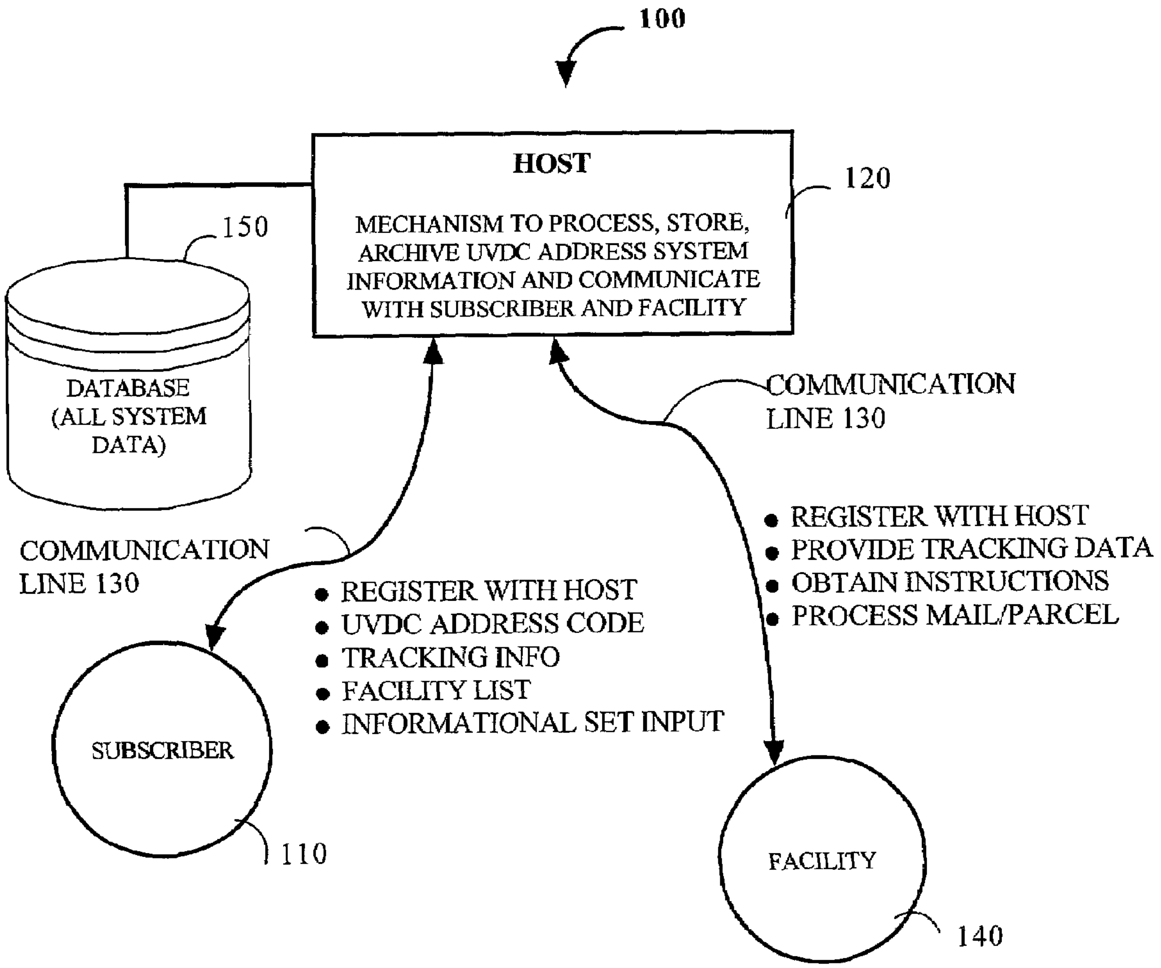
FIG. 1 shows an exemplary block diagram of a mail and parcel addressing management system according to the invention.

Since this new UVDC address and associated system will be transparent to the existing mail and parcel address and delivery infrastructure, it must conform to the implementation of the legacy model so as not to invalidate its usefulness, let alone its methodology. To do so, the inventive unique virtual dynamically-capable (UVDC) addressing system and method as exemplified by FIGS. 1–2 behaves as follows:

In the inventive UVDC addressing system 100, a Subscriber 110 is granted or assigned a unique UVDC address code from a Host 120 upon registration into the UVDC addressing system, via one or more conventional or subsequently developed communication mediums 130. The Subscriber 110 then sets an Subscriber Profile with Host 120 in the form of an informational data set, which may contain both facts and instructions, pertaining to disposition of mail/parcel to a final delivery point designated by the Subscriber. Likewise, Facilities 140 register with the Host 120 and the Host makes these Facilities available system-wide to Subscribers 110, so they can choose from the Host 120 which Facility or Facilities 140 may be insertion points for mail and parcels into the UVDC addressing system 100.

The communication mediums 130 for registration and informational data set input and updating can take many forms. It is preferable for these operations to occur through a networked communications system, such as the Internet, with the operational information being entered via keyboard, stylus or other known or subsequently developed input device by accessing the Host website 120 and its associated database 150. However, the invention is not limited to this and can take more conventional forms, such as telephone entry using DTMF signals generated by telephone keypad entry communicated over a standard telephone line. Alternatively, the registration, subscriber profile and informational data set may even be orally or written communicated to the Host 120 through a conventional telephone line, faxed or mailed to the Host for subsequent entry into database 150 of Host 120 by personnel or other automated procedures.

The informational data sets are preferably contained in a retrievable storage medium, such as a compiled database 150 residing on a server hard disk drive, floppy or CD-ROM as shown. However, any conventional or subsequently developed storage medium capable of containing a compilation database 150 of all UVDC address codes and corresponding informational data sets, both automated and manual, may be used.

Mail and parcels bound for the UVDC addressing system, display a UVDC address code on the mail/parcel itself, typically on, but not limited to, the address label. Either the Subscriber 110 or a Non-Subscriber can insert UVDC addressed mail and parcels into the UVDCA system by entering it/them through a Non-Facility which has it/them delivered to the chosen Facility or by initial delivery to a chosen Facility. The address label includes at least the UVDC address code of the Subscriber and optionally a physical address of a desired processing Facility 140 when the mail/parcel is shipped for initial delivery. However, with the UVDC addressing model, such a physical address does not need to be a final destination point, but may be an interim stopping point in a series of intermediate destination points.

Upon receipt of a UVDC addressed mail/parcel, the Facility 140 queries Host 120, via communications medium 130 (preferably the Internet), to ascertain the disposition of the mail/parcel based on the last known informational data set pertaining to the delivery and forwarding of mail and parcels associated with the respective UVDC address code. The Host 120 provides the Facility 140 with disposition instructions based on the informational data set, so that the Facility 140 transacts the disposition of the subject mail/parcel, which results in the Subscriber having mail/parcel delivered where it is wanted.

Identification and tracking of each mail/parcel is performed by the Host 120 as initiated by the Facility 140 and communicated to each via the communications medium 130 during mail and parcel processing. The Host 120 may then make this information available to the Subscriber 110 during commensurate query, via the same or different communications medium 130, to the Host 120.

Based upon the needs of the Subscriber 110 and the disposition of the mail/parcel package, the Subscriber 110 may at any time update their informational data set with the Host 120, via the communication medium 130, which would allow the Facility 140 and subsequent Facilities, to transact mail/parcel disposition according to the newer informational data set corresponding to the Subscriber's UVDC address code. This updating of the database 150 on a storage medium can occur at any time even after the mail/parcel has been addressed and shipped to any of a chain of non-final destinations because the ultimate destination is not necessarily determined by the address on the mail/parcel, but contained in the changeable remote informational data set, which is centrally located at the Host 120 and uniquely identified within the compilation database 150 of UVDCA codes. Mail/parcel progresses through the UVDC addressing system 100 until final destination of mail/parcel is determined and delivery instructions transacted. To effect such, both Facilities 140 and Non-Facilities can be used to handle and process UVDC addressed mail/parcels.

The Subscriber 110, Facility 140 and Host 120 can be physically located anywhere and at any time so long as there is a communication channel open between the Host/Subscriber and Host/Facility. Also, the implementation of the UVDC addressing model is not dependent on the mail/parcel delivery method or communication medium. There is no limit to the number of Participants as defined above. Actual numbers for each may vary depending of the form of implementation of the UVDC addressing model.

Figure 2:
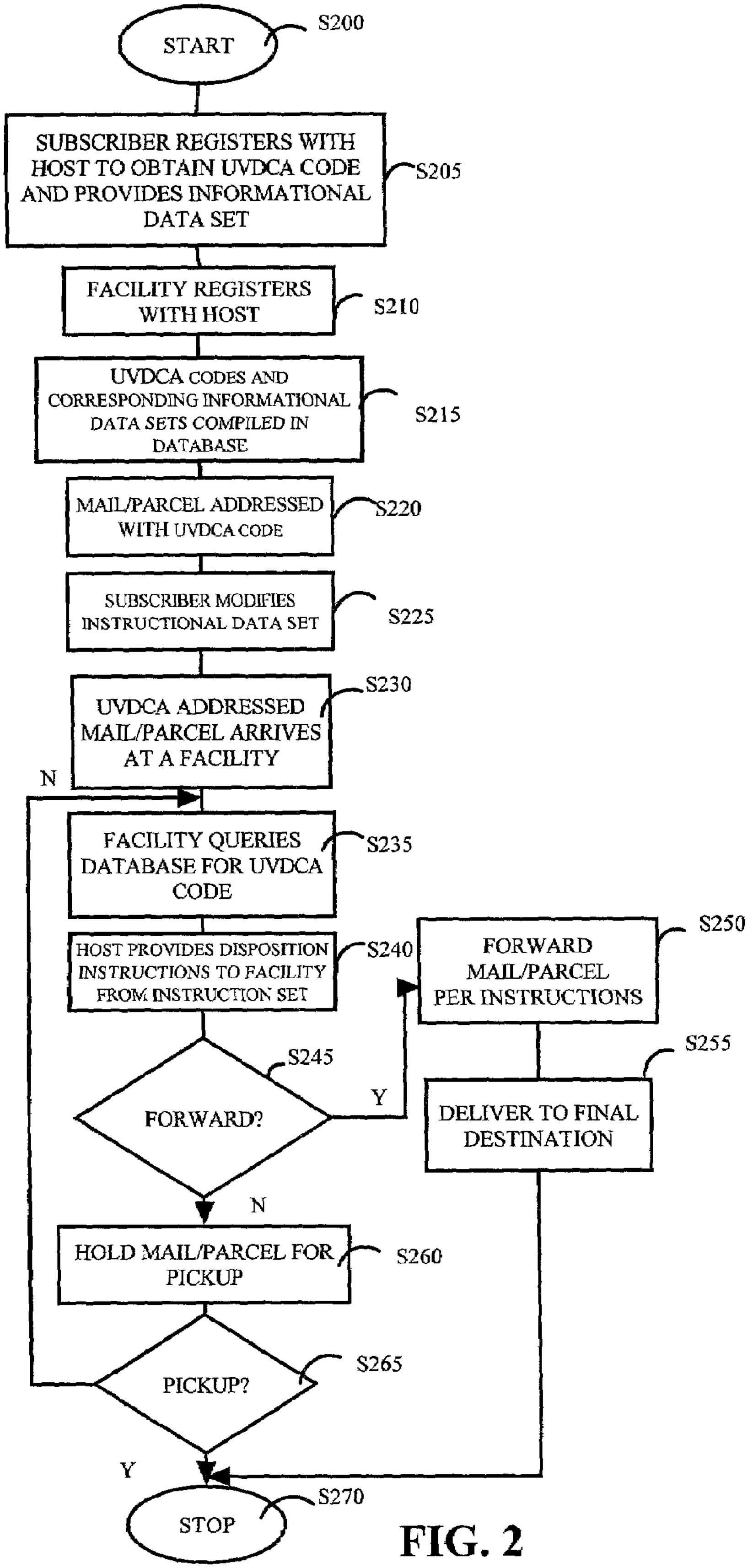
FIG. 2 shows an exemplary flow chart of the operation and capabilities of the addressing system of FIG. 1.

The overall process of the UVDC addressing system 100 can be summarized in the flow chart of FIG. 2. At step 200, the process starts and advances to step 205 where Subscriber 110 registers with Host 120 through communication medium 130 to obtain a unique, virtual dynamically capable address code for the Subscriber. At this time, the Subscriber 110 may provide the Host 120 with the Subscriber's informational data set. However, this can be entered at most any time during the process. At step S210, Facilities 140 may register with the Host 120. However, this step also can be performed at most any time during the process and various Facilities may register throughout any UVDCA system operational cycle.

At step S215, the Host 120 compiles the various UVDC address codes into a compilation, preferably stored as a database 150 in a storage medium, such as a hard disk on a Host computer. This compilation may be in a table or other file association such that a Subscriber's informational data set is linked to the Subscriber's UVDC address code. This step also is a recurring step throughout the process as new Subscribers to the addressing system 100 are continually updated into the compilation database 150 of informational data sets. At step S220, mail/parcel from a sender is addressed with an address containing a Subscriber's UVDCA code and optionally a physical address of a specific physical address representing a Facility that will be receiving and processing the mail/parcel. This mail parcel may then enter a delivery channel that can take many forms, which form is not critical to the invention as the basic requirement is the address containing a UVDCA code identifying the Subscriber and preferably further indicates a Facility 140 at which the mail/parcel is to be initially delivered.

At step S225, a Subscriber 110 may modify its instructional data set. It is important to note that such modification can take place at anytime, including after addressing of mail/parcel in step S220 because final destination for the mail/parcel does not need to rely on the physical address on the mail/parcel label, but instead can be dynamically changed while the mail is in route by querying of the Subscriber's informational data set. At step S230, mail addressed and shipped in step S220 is received at a Facility 140. Upon receipt, Facility 140 may query the compilation database 150 of informational data sets at step S235, such as through communication with Host 120 through communication lines 130, for the corresponding Subscriber UVDC address code identified on the received mail/parcel.

Upon completion of this query step, at step S240 the Host 120 provides disposition instructions to Facility 140 based on the instructional data set corresponding to the UVDC address code found on the mail/parcel. From this disposition information, which can be provided in various forms, the Facility 140 determines at step S245 whether forwarding is required. If so, the process advances to step S250 where the Facility 140 provides a new address label to the mail/parcel package. If mail/parcel is for Subscriber, the label may contain at least the UVDC address code and optionally identification of a final delivery point, such as a physical address, based on the disposition instructions. If mail/parcel is for a recipient other than Subscriber, an appropriate address is applied to mail/parcel as determined by Subscriber informational data set. Then, the mail/parcel at step S255 is delivered to the final destination and the process stops at step S270. If, however, it is determined in step S245 that there is to be no forwarding, at step S260 it is determined that the Facility is the final delivery point and the mail/parcel is held for pickup and the process stops. However, because the system is dynamic, at any subsequent point in time prior to pickup the flow can advance from step S265 to step S235 and the compilation database 150 can be queried again. If the informational data set has been changed, new instructions will then be provided to guide in disposition of the mail parcel. If the parcel has been determined, however, to be picked up at step S265, the process stops at step S270.

As mentioned above, in a preferred embodiment, the communication medium 130 would be the Internet, with there being at least one Host 120 residing on a web server and at least one Participant set. Both the Subscriber 110 and Facility 140 would gain access to the Host 120 via a suitable web browser, in a client/server fashion, via the Internet, which serves as communication medium 130. An exemplary implementation of a UVDC addressing model in this preferred embodiment would look like this:

Using a web browser via the Internet, a Subscriber 110 proceeds to a designated web address of a UVDC 110 addressing Host 120 and registers with or becomes a member of system 100. The Subscriber 110 is then granted or assigned a Unique, Virtual Dynamically-Capable (UVDC) address code by the Host. Associated with the subscriber's UVDC address code, the Subscriber 110 provides to the Host 120 a Member Profile in the form of an informational data set. This data set preferably is in the form of data about the Subscriber 110 and instructions pertaining to the disposition of Subscriber's mail/parcel including delivery and forwarding instructions. When a Subscriber 110 wants a mail or parcel delivered to a specific final delivery point, the Subscriber 110 updates his/her Member Profile with this address, which could be another UVDC address or a legacy address (physical location address). The Subscriber 110 may choose any Facility 140 registered with the Host 120 that best suits the needs of the Subscriber 110 as the entry point into the UVDCA system. The Subscriber 110 ensures that any mail or parcel is addressed using the Subscriber's UVDC address code in conjunction with the chosen Facility 140 according to or by virtue of the UVDC address code found on the mail or parcel itself, typically on the address label. Thus, Subscriber 110 may tell others to address mail/parcels using Subscriber's UVDC address.

When a UVDC addressed mail/parcel is delivered to a Facility 140, the Facility 140 preferably via its web browser logs into the Host site 120 and performs a query to ascertain disposition of the subject mail/parcel. Mail/Parcel is correlated to the Subscriber by the UVDC address code, identified, and tracked by the Host 120 as initiated by the Facility 140. The Facility 140 then transacts disposition of subject mail/parcel as found in the Subscriber's Member Profile, causing the mail/parcel to be delivered to either another Facility, Non-Facility, Subscriber or Non-Subscriber, as the case may be. The mail/parcel may travel in and out of several Facilities and Non-Facilities until it is delivered to its final destination. All of this travel is coordinated by the Host 120 via the updateable Subscriber informational data set.

An exemplary UVDC address in this preferred embodiment, would generally look like this:

Subscriber's Name
Subscriber's UVDC Address Code
Legacy Address Format: Street Number, P.O. Box, etc.
Legacy Address Format: City, State ZIPCODE
Or more particularly:
John Doe
#-123456adbc
123 Main St.
Washington, D.C. 20520

This UVDC address conforms to the more conventional legacy address model, so much so that it is also the same format as what any mail and parcel RFO would use when acting as a Commercial Mail Receiving Authority per U.S. Postal Service regulations. As such, mail/parcel addressed in this fashion is capable of delivery to an ultimate destination regardless of whether the handling facility is a Facility or Non-Facility.

With this in mind, a more detailed look at an exemplary implementation of a preferred embodiment reveals the following: At the Facility 140, via a web browser, the Host 120 is queried about, or in regards to, the UVDC address (in this case the UVDC addressing code) found on a received mail or parcel. The Host 120 reveals the associated informational data set containing instructions to the Facility. The Facility 140 then transacts the disposition found in the informational data set that is associated with the subject UVDC address of the Subscriber 110. More specifically, the data set is associated with the UVDC addressing code. An exemplary informational data set, in the form of subscriber data could include, but is not limited to, email address, telephone number and other contact information about the Subscriber; data set instructions could be, but are not limited to, hold for pickup, forward via bicycle messenger to a legacy address, mail via U.S. Priority Mail to APO/FPO, forward to a legacy Military Mail address or forward via FedEx to another UVDC address or legacy address.

If instructions are to forward mail/parcel to another UVDC or legacy address, the mail/parcel is relabeled with this new UVDC or legacy address and sent there accordingly. Upon completion of all instructions learned by the requisite number of Facilities 140 from the Host 120, the mail or parcel is delivered when and to where the Subscriber 110 wanted their mail and parcels to be.

A unique transaction identifier is preferably further associated with each subject mail/parcel by the Host so that the Host 120, Facility 140 and Subscriber 110 can each identify and track the subject mail/parcel at any stage of the UVDC addressing process.

Several examples using exemplary implementation of the preferred embodiment as described earlier will serve to show various possibilities and capabilities of the UVDCA system.

Scenario 1: A Person's "home" address is P.O. Box 27, Washington, D.C. 20520. Because of this address, commercial parcel carriers cannot deliver packages to Person, but the Sender of certain packages insists on using FedEx or other commercial carriers rather than the U.S. Postal Service. The Person risks losing business and sale opportunities if the Sender of packages via commercial parcel carriers cannot send packages any other way. Similarly, the Sender will lose business or revenues from lost sales opportunities.

UVDC Addressing System Solution 1: The Person registers with the Host via a web browser on the Internet, becoming a Subscriber and being issued a UVDC address which includes a UVDC Address Code (e.g., #-3245A79!). During registration, a Member Profile is created where P.O. Box 27, Washington, D.C. 20520 is designated as a final destination of all UVDC addressed packages for this Subscriber. The Subscriber then selects a closest Facility to the Subscriber, which is located at 1212 Main St., Annapolis, Md. 21410. The Subscriber tells the Sender to provide a shipping address of all FedEx (or other commercial carrier) packages for the Subscriber as follows: John Jones, #-3245A79!, 1212 Main St., Annapolis, Md. 21410. FedEx delivers the addressed packages from the sender to the designated Facility (located at 1212 Main Street). The Facility via its web browser queries the Host for an informational data set for the specific UVDC address code found on the package(s). The Host reveals to the Facility instructions to mail packages (using the U.S. Postal Service) to John Jones, P.O. Box 27, Washington, D.C. 20520. Packages are then identified, tracked, relabeled with the appropriately identified P.O. Box address and mailed to the Subscriber. The Subscriber may then query the Host to learn the disposition of his/her packages and finds they have been received at the Facility and four of six have been mailed to his P.O. Box already.

The Sender is happy since all packages are sent via FedEx as preferred or required by the Sender. The Subscriber is likewise happy since he got the packages delivered to his P.O. Box even though the packages delivery were originated by a commercial carrier (FedEx).

Scenario 2: The same Jane Smith as before lives at 123 Main St., Alexandria, Va. 22307. She travels to 22 different cities for her work. All her mail and parcels are going to a nearby Facility, where she picks up mail when she is home. No matter where she is, she updates her informational data set with the Host via the Internet using a web browser, indicating to have all mail and parcels forwarded and held for pick up at a certain other Facility in the city she is traveling to next. After just arriving in this city, due to a sudden change of plans, she is told to go back home. Again, no matter where she is, she updates her informational data set to include new instructions to have all mail sent to the original Facility near her house. Because she wants to get caught up on all her correspondence as quickly as possible, she has her information data set updated so that all mail and parcels are forwarded via Overnight Express Service. All of this is possible, even if the mail/parcel has already been sent out or even delivered to a Facility, as the Facility will be able to obtain a most current data set with forwarding instructions to ensure that the mail/parcel is properly delivered. When her boss assigns her to 122 cities, she just smiles and asks, "I get a raise, don't I?"

Scenario 3: Subscribers Jim and Mary are sailboaters who love to cruise the Gulf of Mexico from Key West, Fla. to Corpus Christie, Tex. They have all mail and parcels being sent to a Facility in their home town of Philadelphia, Pa. with instructions to hold all. Because all mail and parcels are identified and tracked as the Facility processes them, Jim and Mary query the Host via their web browser over the Internet and examine the list of packages that are being held at the Facility. They scan the list daily until they see that the package from a certain merchant has arrived at the Facility, which they know contains a new bilge pump. They then can update their Subscriber informational data set to select that particular package to be delivered to their next port of call so they can replace the old one and continue on with a happy sail. The remaining mail and parcels stay held at the Facility until Jim and Mary return for pickup or update their informational data set and have the Facility instructions transacted.

Scenario 4: Bill Smith has three children who are grown and have moved away from his home at 227 µm Dr., Washington, D.C. 20520. Since his children like to send him things but really can't afford to, he looks for a way to help them. So he sets up a UVDC address with the Host via the Internet and a web browser. Now as a Subscriber, he informs the Host to have all mail and parcels forwarded to his home. With children in Miami, Fla., Portland, Oreg. and San Diego, Calif., he finds Facilities from the Host in those cities.

Like accepting a collect call from his kids, Bill doesn't want them to spend a lot of money sending him parcels since he lives so far away from them, so he gives each one his UVDC Address that corresponds to the Facility nearest each child and he will pay for the delivery of any mail and parcels they send to him from each Facility to his home address. So to the child in San Diego he gives: Bill Smith, #-34357d, 123 3rd St., San Diego Calif. 92075, to the child in Portland, he gives: Bill Smith, #-34357d, 5411 N. Queen St., Portland, Oreg. 97201, to the child in Miami, he gives: Bill Smith, #-34357d, 890 113th St, SW, Miami, Fla. 33011. Each Facility learns from the Host that they are to forward all mail and parcels received to Bill's home address. Included in the informational data set may be instructions on how Bill will pay for forwarding of the subject mail and parcels, such as by statement billing, credit card, etc. All of Bill's children now only pay for the short and inexpensive part from their home to the respective Facility located in each home town.

As can be seen from the various examples of a preferred embodiment, any UVDC address is transparent to the legacy model. This is because it adheres to the addressing protocol of the legacy model and all existing legacy delivery infrastructure. Since the legacy model is a subset of the UVDC addressing model this would, of course, be true. As such, legacy mail/parcel delivery methods, currently in operation today, will transparently deliver all UVDC addressed mail and parcels.

It should be noted that the Subscriber can be at any physical location when wanting a mail/parcel delivered to a final destination. This final destination can be at any physical location. Each of the Facilities participating in the delivery of subject mail/parcel can be at any physical location. Furthermore, the Host can be at any physical location.

What ties all these potentially disparate physical locations of the Subscriber, Facilities, destination and Host is the UVDC addressing system, UVDC address and the communication medium linking the Host/Subscriber and Host/Facility with the various informational data sets for each UVDC address. The UVDC address is unique, by virtue of the address itself, exemplified by the Subscriber's UVDC address code as shown above. The UVDC address is virtual, in that its existence and usefulness is found only in and by the Host and the Host relating such to the Subscriber and the Facility. This UVDC address is dynamically-capable, in that it can be associated with any of the Facilities at any time. If a UVDC address is "reduced" to being implemented in a non-dynamic way, the UVDC address reverts by definition to a legacy address; limited to that one physical location provided on the UVDC address label on the mail/parcel.

Should a UVDC addressed mail/parcel be sent to a legacy address, and does so with or without participating in any UVDC addressing system, it will arrive as dictated by the given legacy delivery method. In this case, the legacy mail/parcel delivery infrastructure would ignore the exemplary UVDC address code and treat the mail/parcel as any legacy item and deliver it accordingly. The same cannot be said for the reverse of this. Should a legacy addressed mail/parcel be sent to a Facility, with the expectation of the sender that the mail/parcel be delivered to a final destination other than that of the Facility itself, it can go no farther than the Facility. This demonstrates the superiority of the UVDC addressing model over the now obsolete legacy model.

The benefits of this new UVDC addressing model to society in general are significant. Now, a person or company can customize when and to where mail and parcels are delivered to meet individual personal needs by selecting which Facility or Facilities to use and modifying or updating the informational data set associated with the respective UVDC address code. In essence, persons or companies using one UVDC address have access to every Facility as a delivery point all the time, literally allowing an infinite number of actual addresses. A mail/parcel within the UVDC address system can be literally redirected at a moment's notice to a new location. This is a boon to travelers of all kinds—business executives, boaters, truckers or U.S. Government personnel, be they civilian or military.

The UVDC addressing system provides the only addressing system that allows a seamless interface between all elements of the mail and parcel delivery infrastructure, such as between the U.S. Postal System and other non-postal parcel carriers, like United Parcel Services and Federal Express. Now free from the legacy address model, people can get mail and parcels delivered wherever they want, whenever they want, no matter the delivery method, no matter what. All they need is a UVDC Address code and the UVDC addressing system will take care of the rest.

The UVDC addressing model does not invalidate any aspect of the legacy addressing model or mail and parcel delivery infrastructure, rather, in a comprehensive way, it integrates the many disparate features and operations of both the model and infrastructure into a unified system. The above examples of implementations of a preferred embodiment validates this. Future implementations could include, but are not limited to, the following scenario:

Some time in the future . . . . In this scenario, every person is both a Subscriber and a Facility. The Host has issued every person their own UVDC address code. Every Subscriber has provided the Host with an informational data set. The UVDC address structure has been reduced to a single element, such as, but not limited to a barcode, hologram, embedded chip, and magnetic stripe. Every person has the means to read/write UVDC address structure.

Person A creates mail destined to Person B, marking mail with UVDC Address of Person B. Person A, acting now as a Facility queries Host and learns of delivery instructions from Person B's informational data set, and using any delivery method, has mail delivered to Facility X per data set instructions. Facility X, after receiving subject mail and parcel, learns of new instructions found in Person B's informational data set, transacts disposition of the instructions and has mail delivered to Person C, acting as Facility Y, where Person B will pick up mail within three days of its delivery at Facility Y, as based on informational data set provided to Host by Person B. Person B has change of plans again and will not make mail pick up, so Person B updates informational data set at Host to instruct Facility Y to have mail delivered to Person D at legacy address 123 Main St., Washington, D.C. 20520. At the end of three days, Person C acting as Facility Y, queries Host since Person B did not pick up the subject mail and finds updated informational data set and transacts disposition of the instructions has mail delivered to Person D at legacy address 123 Main St., Washington, D.C. 20520.

With such a UVDC addressing system in place in such a comprehensive manner, the only limiting factor of getting a person's mail and parcels to where they are wanted and when, is no longer the address but rather the method of delivery. The UVDC addressing model proposed herein, solves all the problems caused by the shortcomings of an obsolete legacy model. This new model ushers in a new era of addressing relating to mail and parcel delivery and forwarding by seamlessly integrating all forms and methods of delivery while accommodating the growing mobile nature of our society at large.

What is claimed is:

1. A mail/parcel processing system for implementing unique virtual dynamically capable addressing of mail/parcels, comprising:

means for enrolling at least one subscriber into the system, whereby an associated unique, virtual dynamically capable address (UVDCA) code is assigned to the subscriber;

means for enrolling at least one processing facility into the system that processes mail/parcels containing an address that includes a UVDCA code corresponding to the at least one subscriber;

means for creating and maintaining a compilation of unique virtual dynamically capable address (UVDCA) codes containing a plurality of informational data sets, each informational data set relating to a specific subscriber, which pertains to processing instructions for disposition of a mail/parcel initially addressed with an address that contains a UVDCA code that has been received by the at least one processing facility;

means for inputting processing instructions into an informational data set corresponding to the UVDCA code at least once prior to processing mail/parcel at the at least one processing facility;

means for querying the compilation of (UVDCA) codes at least once prior to final disposition of the mail/parcel to obtain the informational data set corresponding to the UVDCA code found on the mail/parcel; and means for instructing the at least one processing facility on processing the mail/parcel, including identification of a final destination point and at least one of method of delivery and method of handling based on the corresponding informational data set associated with the subscriber's UVDCA code queried by the query means.

2. The mail/parcel processing system of claim 1, wherein the informational data set contains contact information for the particular subscriber associated with the UVDCA code.

3. The mail/parcel processing system of claim 2, wherein the contact information includes an email address.

4. The mail/parcel processing system of claim 2, wherein the contact information includes a telephone number.

5. The mail/parcel processing system of claim 1, wherein the informational data set contains billing information for the subscriber associated with the UVDCA code.

6. The mail/parcel processing system of claim 5, wherein the billing information includes identification of statement billing.

7. The mail/parcel processing system of claim 5, wherein the billing information includes identification of credit card information.

8. The mail/parcel processing system of claim 1, wherein the informational data set contains a list of at least one named person associated with a legal entity subscriber's UVDCA code.

9. The mail/parcel processing system of claim 1, wherein the informational data set contains at least one final destination point for mail/parcels associated with subscriber's UVDCA code so processed by a facility, including a primary delivery address other than the subscriber's own delivery address.

10. The mail/parcel processing system of claim 1, wherein the informational data set contains handling instructions for mail/parcels associated with subscriber's UVDCA code so processed by the facility.

11. The mail/parcel processing system of claim 10, wherein the handling instructions include at least one of hold all mail/parcels, forward all mail/parcels, hold specific mail/parcel X and forward specific mail/parcel Y.

12. The mail/parcel processing system of claim 1, wherein the informational data set contains subscriber designated instructions for delivery methods for mail/parcels associated with the subscriber's UVDCA code so processed by the facility.

13. A method for implementing disposition of a mail/parcel upon receiving mail/parcels at a processing facility, the mail/parcels containing an address that contains a unique virtual dynamically capable address (UVDCA) code associated with a subscriber, comprising:

enrolling at least one subscriber into the system, whereby an associated unique, virtual dynamically capable address (UVDCA) code is assigned to the subscriber;

enrolling at least one processing facility into the system that processes mail/parcels containing an address that includes a UVDCA code corresponding to the at least one subscriber;

creating and maintaining a compilation of unique virtual dynamically capable address (UVDCA) codes containing a plurality of informational data sets, each informational data set relating to a specific subscriber, which pertains to processing instructions for disposition of a mail/parcel initially addressed with an address that contains a UVDCA code that has been received by the at least one processing facility;

inputting processing instructions into associated informational data sets at least once prior to processing mail/parcel at the at least one processing facility;

querying the compilation of (UVDCA) codes at least once prior to final disposition of the mail/parcel to obtain the informational data set corresponding to the UVDCA code found on the mail/parcel; and instructing the at least one processing facility on disposition of the mail/parcel, including identification of the final destination point and at least one of method of delivery and method of handling based on the corresponding informational data set associated with the subscriber's UVDCA code queried by the query means.

14. The method according to claim 13, wherein the informational data set includes subscriber designated instructions on method of delivery by the facility.

15. The method according to claim 13, wherein the informational data set includes subscriber billing information, further comprising billing the subscriber based on the subscriber billing information.

16. The method according to claim 13, wherein the information data set includes handling instructions including at least one of hold all mail/parcels, forward all mail/parcels, hold specific mail/parcel X, and forward specific mail/parcel Y.

17. The mail/parcel processing system of claim 1, wherein at least two processing facilities are enrolled and may query the (UVDCA) code assigned to each subscriber.

18. The method according to claim 13, wherein at least two processing facilities are enrolled and querying of the (UVDCA) code assigned to each subscriber is performed by the at least two processing facilities.

* * * * *